United States Patent
Cobb et al.

[11] Patent Number: 5,098,583
[45] Date of Patent: Mar. 24, 1992

[54] METHOD FOR PRODUCING HIGH SOLIDS SLURRIES OF CLAY WATER PRODUCTS

[75] Inventors: Gary L. Cobb, Davisboro; Michael W. Ginn, Wrightsville; L. Gene Broxton, Sandersville, all of Ga.

[73] Assignee: ECC America Inc., Atlanta, Ga.

[21] Appl. No.: 534,455

[22] Filed: Jun. 4, 1990

[51] Int. Cl.⁵ .................. B01D 37/00; B01D 37/03; B01D 39/20
[52] U.S. Cl. .................. 210/767; 210/770; 210/510.1; 210/902; 209/10; 209/164
[58] Field of Search .............. 210/510.1, 767, 808, 210/902, 498, 770, 768, 771; 209/10, 164

[56] References Cited

U.S. PATENT DOCUMENTS

| | | | |
|---|---|---|---|
| 2,990,958 | 7/1961 | Greene | 209/166 |
| 3,807,298 | 4/1974 | Luke | 210/225 |
| 3,974,067 | 8/1976 | Nott | 209/166 |
| 4,303,492 | 12/1981 | Eichler | 204/300 R |
| 4,381,998 | 5/1983 | Roberts | 210/510.1 |
| 4,452,698 | 6/1984 | Roberts | 210/510.1 |
| 4,528,099 | 7/1985 | Rieger | 210/510.1 |
| 4,604,174 | 8/1986 | Bollinger | 204/301 |
| 4,863,656 | 9/1989 | Hindström | 210/510.1 |
| 4,956,088 | 9/1990 | Hindström | 210/510.1 |
| 4,981,589 | 1/1991 | Hindström | 210/510.1 |

FOREIGN PATENT DOCUMENTS

| | | | |
|---|---|---|---|
| 8806480 | 9/1988 | PCT Int'l Appl. | 210/510.1 |
| 8807402 | 10/1988 | PCT Int'l Appl. | 210/510.1 |
| 8807887 | 10/1988 | PCT Int'l Appl. | 210/510.1 |

Primary Examiner—Stanley S. Silverman
Assistant Examiner—Thomas M. Lithgow
Attorney, Agent, or Firm—Klauber & Jackson

[57] ABSTRACT

In the process for beneficiating a crude kaolin by the method which includes a wet classification step to provide a classified kaolin fraction having a PSD such that at least 50% by weight thereof are of less than ½μm ESD and substantially 100% by weight are of less than 10 μm ESD; and one or more steps wherein an aqueous slurry of the classified kaolin is at least partially dewatered by filtration; the improvement which comprises effecting at least one of said one or more filtration steps, by flowing said aqueous kaolin slurry through a ceramic filter plate which is characterized by a porous support layer and an overlying porous filtration layer, the ratio between the respective mean pore sizes of the filtration layer material and the base layer material being between about 2 and 50; the pore size in said filtration layer being in the range of from about 1 to 3 μm, and the pore size in the base layer being in the range of from about 4 to 50 μm; and said flow through said filter plate being from said filter layer toward said base layer, and being effected by establishing a fluid pressure differential across the said filter plate.

17 Claims, 2 Drawing Sheets

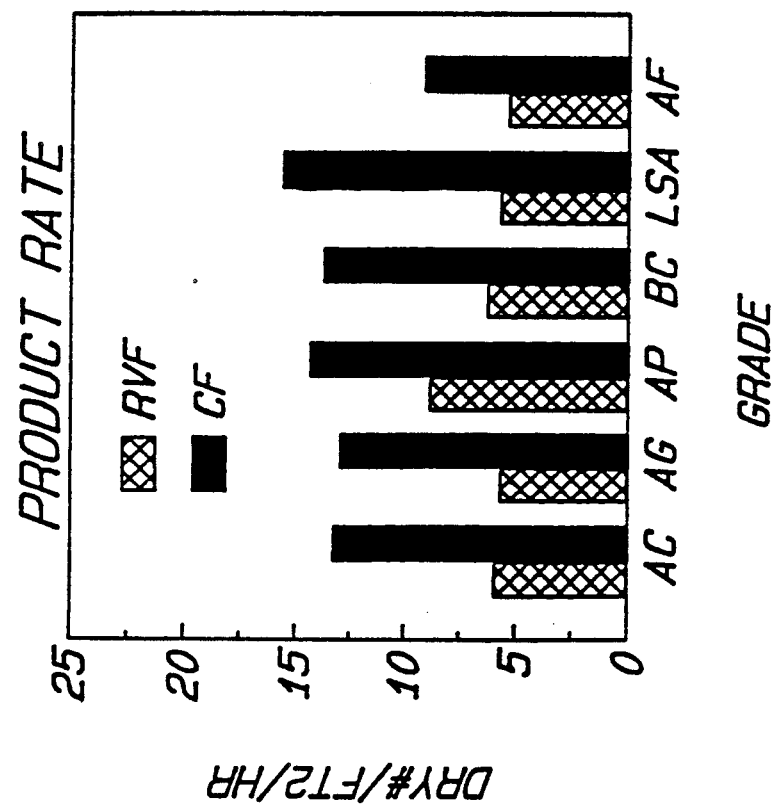

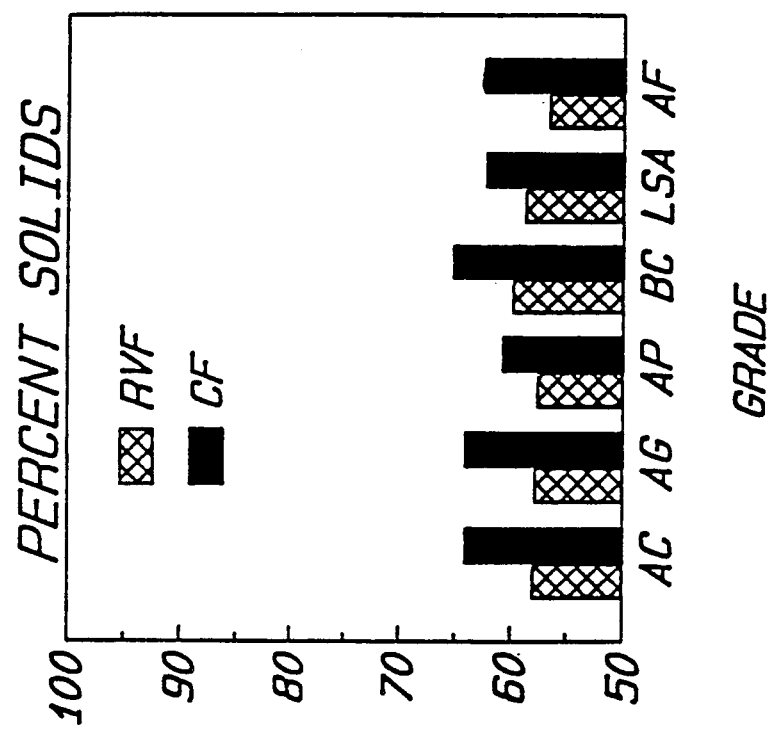

METHOD FOR PRODUCING HIGH SOLIDS SLURRIES OF CLAY WATER PRODUCTS

BACKGROUND OF INVENTION

This invention relates generally to methods for beneficiation of industrial minerals, and more specifically relates to an improved method for dewatering industrial minerals of very fine particle size, such as kaolin clays.

In the course of processing various crude industrial minerals such as kaolin clays, the crude materials are commonly subjected to a series of steps intended to remove undesired impurities such as discolorants, so as to ultimately provide a refined product which is susceptible to the particular use for which it is intended. In the instance, for example, of kaolins, such beneficiation may in some instances be accomplished by dry processing techniques, as for example by air flotation. More commonly, however, especially where the impurities or contaminants to be removed are in some manner chemically combined or intimately associated with the mineral, wet processes of various types are employed. These include such well-known processes as froth flotation, reductive and oxidative bleaching, and high intensity magnetic separation. This is in addition to wet classification, which can also be regarded as a beneficiation step achieving some of the aforementioned objectives.

Thus, in a typical procedure wherein the initial starting material is a crude sedimentary kaolin clay, including from about 1-2% titania, the said crude may be subjected to a separation process to reduce the titania content to below 0.8% by weight. More generally, the titania will be reduced to the range of from about 0.2 to 0.8. Where a froth flotation process is used for such purposes, the clay may be initially blunged and conditioned by forming an aqueous alkaline dispersion of the clay (pH adjusted to about 7-10 with ammonium hydroxide). The dispersion may include as a deflocculating agent various compounds known to be useful for such purposes, such as sodium silicate. Other useful agents include a water-soluble salt of a polyacrylic acid or polymethacrylic acid preferably having an average molecular weight in the range of from about 500-10,000. Oleic acid or other collector agent is added during the conditioning process. Reference may be had to U.S. Pat. No. 3,974,067 for further details of flotation procedures which may be utilized. Further aspects of flotation treatment of the aforementioned type can be found in numerous places in the prior art, including in Cundy, U.S. Pat. No. 3,450,257, and in U.S. Pat. Nos. 2,990,958 and 3,138,550.

The purpose of the froth flotation in the foregoing sequence is to remove titania; and accordingly other techniques can be utilized in place of or to supplement flotation, including by passing the slurry in relatively dilute form and while the clay is dispersed (typically at about 30% solids) through a high intensity magnetic field, e.g. via a magnetic separator of the type disclosed in Marston, U.S. Pat. No. 3,627,678. Such device comprises a canister packed with stainless steel wool at which enveloping magnets are capable of providing a high intensity field of 12 kilogauss or higher. Froth flotation may be combined with magnetic separation to achieve additional effects, see for example U.S. Pat. No. 3,974,067 to Allen & J. Knott.

A further commonly used method for improving the brightness and whiteness of kaolin clays involves chemical bleaching. In this connection, it is noted that one of the principal sources of discoloring contaminants in the crude clay takes the form of insoluble oxides of iron. Thus, a common bleaching technique for removing the said contaminants, involves forming the clay into an aqueous slurry, acidifying the slurry to a pH of the order of 3.0 to 4.0 and adding a slurry soluble salt of hydrosulfurous acid. The general objective of this operation is to provide the $S_2O_4^=$ ion which acts as a reductive bleaching agent. Such ion functions to reduce the ferric compounds present in the slurry to ferrous form, the latter being readily soluble and therefore removable by subsequent washing, dewatering and filtering operations.

A still further type of beneficiation treatment applicable to kaolin crudes involves high temperature calcination. It is useful here to point out that those skilled in the art of kaolin processing products draw a relatively sharp distinction between so-called calcined clays and clays which have not been subjected to calcination and are usually referred to as "hydrous" clays. With respect to such terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to impair the basic crystal structure of kaolin. These so-called "hydrous" clays may have been produced from crude kaolins, which have been subjected to beneficiation as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the structure can be (and often is) arbitrarily written in the form 2 $H_2O\cdot Al_2O_3\cdot 2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, when the term "kaolin" or "kaolinite" is utilized, such term necessarily implies that the original structure of the material is intact. Thus, the term "kaolin" as used herein, can be considered to be equivalent to the technically inaccurate (but oft-occurring) prior art usage, "hydrous kaolin" or sometimes simply "hydrous clay".

Detailed discussions of calcined clays and their method of preparation may be found in numerous prior art patents. Particular reference may be made in this connection to U.S. Pat. No. 3,014,836 to Proctor, Jr.; U.S. Pat. No. 3,586,523 to Fanselow et al; and to A.D. McConnell et al. U.S. Pat. No. 4,381,948. The procedures set forth for producing a calcined clay is detailed in the said McConnell et al patent and provides a product substantially corresponding to the commercially available product ALPHATEX ® of the present assignee ECC America Inc. In the said procedure, which is exemplary of modern practice in the calcined clay art, the crude kaolin clay is blunged and dispersed to form an aqueous dispersion. The blunged and dispersed aqueous slurry is subjected to a particle size classification from which there is recovered a fine fraction slurry of the clay. Following this, the clay may be dewatered by being flocculated and filtered, redispersed as a slurry and dried; or the classified slurry may be dewatered by directly drying, for example by spray drying.

As is discussed in Fanselow et al and elsewhere, the calcined clay process as same has been outlined, can be supplemented by use of additional beneficiation steps such as those previously discussed, i.e. froth flotation, high intensity magnetic separation, and the like.

It will be evident from the foregoing that whether one is considering the processing of so-called hydrous clays or of calcined clays, at various points in the processing of same, dewatering by filtration is a common and necessary step. The predominant practice in the kaolin industry calls for such filtration to be accomplished by rotary vacuum filters (RVF), although other instrumentalities are also used as will be further discussed. Dewatering of kaolin slurries by use of such apparatus is normally accomplished in an acid (3.0-3.5 pH) flocculated condition. Most commonly, the dewatering process usually follows bleaching, and entails heating to approximately 130° F. and filtering using a rotary vacuum drum filter. Typically this technique produces a 56-62% solids product cake, and is regarded as the industry standard.

Dewatering by use of plate and frame presses, is also accomplished in an acid (3.0-3.5 pH) flocculated low solids (20-30%) condition. This technique produces a 70-72% solids product cake, but is not generally considered cost effective. Automation in recent years has somewhat offset the economic disadvantage of this type of apparatus.

In a series of patents including e.g. U.S. Nos. 3,753,498, 3,753,499, and 3,782,554, assigned to ECC International Limited at St. Austell, Cornwall, England, tube presses are described, which are also useful when filtering kaolins and similar very fine particle size minerals. Dewatering is again accomplished in an acid (3.0-3.5 pH) flocculated low solids condition. The technique has the advantage of producing a 75% solids product cake, but is unfortunately maintenance and cost intensive.

One of the known exceptions to the inability of prior art filtering techniques to effectively filter very fine particle size minerals such as kaolins having particle size distribution (PSD) such that 50% or more of same by weight are of less than 0.5 $\mu$m, involves use of the so-called electrically augmented vacuum filter ("EAVF"). Reference may be had in this connection to such use in Mixon. Jr., U.S. Pat. No. 4,246,039. Use of an EAVF enables filtering of dispersed (7.0-9.0 pH) high solids (55-60%) feed slurries; and the said filter is also capable of producing an 80-85% solids product cake. The EAVF technology is such that flocced kaolins cannot be effectively filtered. While it would be thought because of these advantages that the said filtering technique would have come into widespread commercial use, such is decidedly not the case. This is explained by the complexity of the device (which is based upon the principle of providing an electric field which appropriately interacts with a membrane), and the attendant high costs of maintaining and operating such device. Simply stated, the devices have not proved reliable or economically feasible for widespread application.

A further technique which has found application to dewatering of clays, is simple thermal evaporation. According to this technology, 60% solids filtered product can be thermally evaporated until the slurry reaches 70% solids. This technology is of specialized interest in application, but cannot meet the variety of needs and conditions for use required in industry such as the kaolin processing industry.

A still further technique for dewatering involves the use of centrifuges. These systems can be very effective for dewatering especially with feeds in the 20-30% range, and products up to the 50% range. When these limits are reached, the slurry viscosity and mechanical speed constraints, reduce cost effectiveness and performance to unacceptably low levels.

For some years the concept of ceramic filtration has been known as a method for dewatering a range of materials including minerals, and such filtration techniques are in commercial use at various points in the world for the dewatering and filtering of relatively coarse minerals. Certain recent developments in the field of ceramic filtration have provided ceramic filter constructions which have proved very effective in the filtration of relatively coarse sized minerals. Reference may especially be had in this connection to international applications WO88/06480, WO88/07402, and WO88/07887. The ceramic filtering elements described in these applications are characterized by an underlying porous support layer, and an overlying porous filtering layer. The ratio of the mean pore size in the support layer to that of the filter layer is in the range of about 2 to 50. The pore size in the support layer is of the order of 1-3 $\mu$m and that of the filter layer is in the range of from about 4-10 $\mu$m. The pores are relatively uniform—i.e., there is a very narrow distribution (within the ranges indicated), so that one may operate at a determined bubble point with assurance that negligible air will pass through the filter during filtration, which may be accomplished at a very high efficiency. Further details respecting composition and preparation of these ceramic filter materials is set forth in said publications, the entire contents of which are hereby incorporated by reference.

Heretofore, the use of these materials has been limited to relatively coarse particle minerals, having a size range of approximately 1 $\mu$m or (in general) much higher. In the case of minerals such as kaolins, it has heretofore proved impractical on any commercial scale to successfully effect filtration of such materials where the average particle size is substantially below about 1 $\mu$m where substantial quantities of the particles are $<\frac{1}{2}$ $\mu$m, and where the slurry from which said kaolin is to be filtered contains the kaolin is a dispersed or fully dispersed state. This is indeed the reason why the great bulk of filtration practiced in the kaolin industry, requires the use of flocculation as a precedent step to filtration. Consideration of the prior art and patents and the like will amply demonstrate this point.

Aside from the fact that flocculation introduces a complex and additional step into kaolin processing, it also has the effect of adding further undesired chemical species into the slurry, i.e., the flocculation is usually accomplished by acidification, e.g. with the addition of sulfuric acid or other acid-introducing species, which further complicates the process chemistry due to the need for later neutralization. The result of the latter can be the creation of fluxing agents, unless a great degree of washing is used, which indeed is one of the further consequences of flocculation and conventional filtering. (Fluxing agents are of great concern where the kaolin being processed is intended as a calciner feed.) It will be evident that were it possible to effectively filter to high solids and at commercially acceptable rates by simple and effective means, that a vast improvement in kaolin processing would be enabled.

In accordance with the foregoing, it may it be regarded as an object of the present invention to provide a method, whereby slurries of fine particle sized minerals, including especially kaolin clays, may be effectively and rapidly filtered, even where same are in a partially or fully dispersed state.

It is a further object of the invention, to provide a method of the foregoing character, wherein filtration is effected without the need for addition of flocculating agents; and where further, such filtration can be accomplished at any desired pH, including neutral pH.

SUMMARY OF INVENTION

Now in accordance with the present invention, the foregoing objects, and others as will become apparent in the course of the ensuing specification, are achieved by an improvement which is applicable to the process for beneficiating a crude kaolin which includes a wet classification step to provide a classified kaolin fraction having a PSD such that at least 50% by weight thereof are of less than $\frac{1}{2}$ μm ESD and substantially 100% by weight are of less than 10 μm ESD; and wherein an aqueous slurry of the classified kaolin is at least partially dewatered by filtration. According to the invention, at least one or more of the filtration steps are effected by flowing the aqueous kaolin slurry through a ceramic filter plate. The filter plate is characterized by a porous support layer and an overlying porous filtration layer, the ratio between the respective mean pore sizes of the filtration layer material and the material of the base layer being between about 2 and 50. The pore size in the filtration layer is in the range of from about 1 to 3 μm and the pore size in the base layer is in the range of from about 4 to 50 μm. The flow through the filter plate is from the direction of the filter layer toward the base layer, and is effected by establishing a fluid pressure differential across the filter plate, preferably by application of vacuum or partial vacuum conditions at the side of the filter plate to which the water is drawn. In accordance with one aspect of the invention, the kaolin subjected to the filtration may be substantially fully dispersed in the slurry being treated, and the pH of the slurry can be in the range of from about 6.0 to 8.0. The kaolin subjected to the filtration may also be in a flocculated state or in a state of partial dispersion. More generally, the pH of the slurry treated by the invention may therefore reside anywhere in the broad range of from about 2 to 10.

The method of the invention may be used to treat a grey kaolin where the classification step has provided a fraction having a PSD such that at least 95% by weight thereof are of less than 1 μm ESD. This fraction can also have been subjected to a high intensity magnetic separation of a dispersed slurry and the output from the magnetic separator may be passed to the ceramic filter without use of any intervening flocculation step. Similarly, an oxidative bleaching step, as for example by use of ozone, may have been used upstream of the magnetic separation of the grey kaolin. The partially dewatered slurry from the ceramic filter can be spray dried to provide a feed for subsequent calcination (oxidative bleaching would not be used when the product was intended for calcination.

More generally, the method of the invention may be used to treat any coarse or fine grey kaolin. These kaolins cannot normally be beneficiated by oxidative bleaching and also do not flocc well. The present invention, however, facilitates beneficiation of these grey kaolins in a process which can include one or more of such steps as blunging, degritting, magnetic separation, ozonation, classification and dewatering.

In the case of the flocculated kaolin, the partially dewatered kaolin slurry from the ceramic filter can be dispersed and then dewatered at a further ceramic filter to provide a high solid slurry including >70% by weight solids. This high solids slurry may be used directly in that form, or may be spray dried to provide a product. Where the kaolin in the slurry provided to the ceramic filter is at least partially dispersed, it may include about 60% solids, and the slurry can be further dewatered by the ceramic filter, to again provide a slurry having >70% solid.

The method of the invention offers several benefits in kaolin processing. Among these are: Kaolin particle size ranging from coarse to ultrafine (10 μm to $\frac{1}{4}$ μm) can be filtered. Kaolin processing can be effectively performed in a wide range of pH's, i.e., from 2 to 10. Economical dewatering rates and product solids using various feed solids 5-70%, solids with product solids up to 80% can be obtained using this technology. The process of the invention operates under broad temperature ranges, filters flocced, semi-dispersed, and dispersed feeds, where the resulting filtrate is clear with little or no suspended solids.

BRIEF DESCRIPTION OF DRAWINGS

FIG. 1 is a bar graph showing normalized production rates for processes based on conventional filtering technology and on technology according to the invention; and FIG. 2 is a bar graph similar to FIG. 1, but showing percent solids off the filter achieved by use of prior art technology compared to use of the invention.

DESCRIPTION OF PREFERRED EMBODIMENTS

Practice of the present invention will now be illustrated by a series of examples, which, however, are to be considered exemplary only and not delimitive of the invention which is otherwise set forth.

EXAMPLE 1

The ceramic filtering apparatus utilized in the present and ensuing examples is of the type set forth in International Patent Application WO88/07402, published Oct. 6, 1988. The further details of the filter construction utilized in the apparatus mentioned, also appear in International Publication No. WO88/06480, published September 7, 1988. More specifically, a 10 ft$^2$ pilot ceramic disc style filter of this type was utilized herein to evaluate the dewatering characteristics of various feed kaolin clays. A feed tank was provided for the slurry to be tested, and such slurry after first being passed through a hot water bath at 210° F., was fed to the filter at about 113° F., which was maintained in a tank holding the fed slurry. An automatic valve controlled the level of the slurry in the tank. Surface level indicators were used to control the upper and lower levels in the filtrate tank and when the filtrate tank became full, indicators opened a pneumatically controlled valve and the tank was automatically discharged. The filter was equipped with a cradle type agitator keeping the slurry in suspension. The drum was equipped with machined discs to which the filter plates were attached. Drum speeds were varied to optimize production rates and cake dryness. The filter cake built up and dewatered on the filter plates as the drum rotated and then the dewatered cake was removed by scrapers positioned on both sides of the plate. After removal, the cake fell into a hopper for transportation. The filter plates were cleaned periodically with ultrasonic transducers.

Various grades of flocced low solids feeds were obtained from a plant process prior to conventional rotary vacuum filtration. Each grade was evaluated at 2 cycle/minute at temperatures of 40°–45° C. and pH's of 3.0–3.5. This yielded the following results:

TABLE 1

| Grade | Feed Solid | Dry lbs/ft²/hr | Product Solids |
| --- | --- | --- | --- |
| Alphafine[1] (AF) | 20.7% | 12.3 | 57.1% |
| Alphaplate[2] (AP) | 18.5% | 12.3 | 59.4% |
| Alphagloss[3] (AG) | 20.8% | 7.3 | 65.3% |
| LSA[4] (LSA) | 21.5% | 15.7 | 62.3% |

The number-marked products are all available from ECC America Inc. and are characterized by the following size distribution (in weight %):
[1] 98 < 2 μm; 45 to 50 < ¼ μm
[2] 80 to 85 < 2 μm
[3] 93 < 2 μm; 30 < ¼ μm
[4] 90 < 2 μm; 20 to 30 < ¼ μm Where the products of this Example are filtered through a conventional RVF, portions of the flocced kaolin will readily pass through the filter cloth. For example, with the Alphafine product, about 3–5% by weight will pass through RVF. This necessitates additional processing to recover the lost material. With the present invention, separation is so complete that the resulting filtrate is virtually free of suspended kaolin particles.

EXAMPLE 2

In this Example various grades of high solids dispersed clay slurry were obtained from a plant process before conventional filtration. Each grade was evaluated at 2 cycles/min. at temperatures of 40°–45° C. and pH's of 7.0–7.5. Results were as follows:

TABLE 2

| Grade | Feed Solid | Dry lbs/ft²/hr | Product Solids |
| --- | --- | --- | --- |
| Alphafine[1] (AF) | 55.5% | 6.2 | 74.4% |
| Alphaplate[2] (AP) | 56.7% | 7.9 | 74.5% |
| Acme[5] (AM) | 54.3% | 19.4 | 78.2% |
| Betacote[6] (BC) | 61.8% | 10.1 | 77.5% |

[5] 60 to 80 < 2 μm
[6] 80 to 85 < 2 μm

The data revealed that a >74% solids filter product was consistently obtainable by the method indicated using dispersed feed slurries. Where conventional RVF's are used, substantially all of the dispersed kaolin particles pass through the filter cloth.

EXAMPLE 3

The use of the ceramic filter apparatus as above set forth, was compared with a rotary vacuum filtration process, in each instance based upon the same product slurry in otherwise identical conditions of filtration. Flocced feed was used in these comparisons because dispersed feed could not be effectively filtered with the rotary vacuum filter. In FIG. 1 bar graphs appear setting forth production rates in dry lbs/ft² of filter surface/hour for six commercial products of the assignee ECCA (see Examples 1 and 2 for product identification) for the two different instrumentalities, i.e., the ceramic filter and the rotary vacuum filter. In each instance (except for the filter used) the conditions of processing were identical with respect to the slurry treated, and resulting rates were normalized to reflect dry lbs/ft²/hour. The ceramic filter was of the type before mentioned in Example 1. The rotary vacuum filter was the conventional commercial product of Eimco. The striking improvements in production rates yielded by practice of the invention are plainly seen. In corresponding FIG. 2, bar graphs set forth the percent solids achievable by the respective instrumentalities referred to for flocculated slurry feed conditions where as the inputted flocculated kaolin slurries had in each instance a slurry solids content of between 20 to 25%. The vast improvement achieved by use of the ceramic filter will be evident.

EXAMPLE 4

In order to demonstrate the practice of the present invention and the commercial advantages thereby achieved, a 30% solids flocculated feed is used herein in a variety of procedures. In the conventional control procedure, this slurry is first passed to a conventional rotary vacuum drum filter, resulting in a 60% solids slurry. This cake is then fully dispersed with sodium polyacrylate and sodium hydroxide. Part of this dispersed slurry is spray dried. The remaining slurry is mixed with spray dried product to result in a 70% solids product.

In accordance with the invention, the procedure is varied by utilizing a ceramic disc filter of the aforementioned type for the first filter pass. The filter cake is then fully dispersed and fed to another ceramic disc filter and dewatered. The resulting 77% solids slurry is then mixed with water to reduce solids to 70%.

EXAMPLE 6

The procedure here is the same as in Example 5, except a ceramic disc filter is used. The filter cake is then fully dispersed and fed to another ceramic disc. The approximately 77% solids filter cake is then dispersed and diluted with bypassed dispersed slurry feeding a conventional rotary vacuum, filter resulting in a 70% solids slurry. The addition of slurry instead of water for dilution results in an increase in slurry makedown rate of 2.5 tons/hour over the procedure of Example 1.

EXAMPLE 7

In this Example a conventional rotary vacuum drum filter is used resulting in a 60% solids cake. The filter cake is then semi-dispersed with sodium hydroxide to obtain a slurry viscosity of approximately 600 cps. The semi-dispersed feed is then filtered again with a ceramic disc filter resulting in a 72.6% solids filter cake. The cake is then fully dispersed with sodium polyacrylate and diluted with water to 70%.

EXAMPLE 8

In this Example, a conventional rotary vacuum drum filter is used for a first filtration resulting in a 60% solids cake. Part of the resulting cake is then semi-dispersed and filtered with a ceramic disc filter resulting in a 72.6% filter cake. The remaining 60% solids cake from the rotary drum filter is fully dispersed and used to dilute the ceramic disc filter cake to 70% solids.

EXAMPLE 9

In this Example, a conventional rotary vacuum drum filter is used for a first filtration, resulting in a 60% solids cake. The cake is then fully dispersed and filtered using a ceramic disc filter. The remaining approximately 77% solids filter cake is diluted with water to produce a 70% solids slurry.

EXAMPLE 10

In this Example, a conventional rotary vacuum drum filter is used for a first filtration, for a 60% solids cake. The filter cake is then fully dispersed and refiltered using a ceramic disc. The resulting filter cake is then diluted to 70% solids with the remaining filter slip from the first pass.

EXAMPLE 11

In one conventional plant filtration system, rotary vacuum filtration of flocced feeds results in approximately 60% solids slurry. This cake is redispersed with sodium hydroxide and sodium polyacrylate to ensure maximum dispersion. Approximately 40% of this dispersed filter slip is spray dried and added back to the filter slip resulting in a 70% solids slurry ready for shipment. Due to the addition of spray dried clay to produce high solids slurry, there is a decrease in wet-out capability and in brightness. This wet out, if not properly dispersed with enough energy input, causes product quality degradation over time creating instability during shipping. These two areas are eliminated with ceramic filtration.

The ceramic filtration system used in Example 9 consists of a circuit utilizing dispersed rotary vacuum drum filter product as a feed for the ceramic disc filter. This process results in a >75% solids filter cake. Water is added to the filter cake to reduce the solids to 70%, producing the specified shipping solids. This system will eliminate the necessity of adding any spray dried material to increase slurry solids, excluding the possibility of makedown difficulties, brightness reduction, and the associated costs incurred from reslurrying spray dried clays. High solids filtration also has the added advantage of higher salts removal, resulting in improved product stability and better viscosities.

A series of tests were thus conducted, using various grades of dispersed filter product obtained from plant production. A portion of each sample was used to produce a 70% solids slurry, using laboratory methods that parallel commercial slurry makedown procedure. The remaining sample was filtered using the ceramic disc pilot filtration system. Water was added to the resulting >74% solids filter cake to produce a 70% solids slurry. A dispersant demand test was performed on each slurry, and the appropriate amount of sodium polyacrylate was added to each ensuring optimum dispersion. Samples were mixed for 1, 3, 5, 10, and 15 minutes. High-shear and 1-, 3-, and 7- day stability tests were performed on each slurry. The data for 5-minute mixing time is tabulated in Table 3.

In all cases, ceramic disc filtration resulted in a marked improvement in high shear viscosity, with fine grades having the greatest improvement margins.

Ceramic disc filtration also improved the 1-, 3-, and 7-day stability in almost all cases. This is attributable to the greater salts removal capabilities of dispersed high solid filtration. Displacement washing and/or rinsing would demonstrate greater improvement. Again, the fine grades showed the largest improvement.

TABLE 3

| Grade | High Shear | Stability (Brookfield Viscosity) | | |
|---|---|---|---|---|
| | | 1 Day | 3 Day | 7 Day |
| AF Conventional | 3130 | 1950 | 2775 | 3275 |
| AF Ceramic Disc | 4120 | 1225 | 1400 | 1375 |
| BG Conventional | 4400 @ 14.0 | 900 | 1100 | 1175 |
| BG Ceramic Disc | 4400 @ 7.5 | 900 | 775 | 650 |
| AC Conventional | 2480 | 650 | 725 | 750 |
| AC Ceramic Disc | 3800 | 325 | 350 | 375 |
| BC Conventional | 2470 | 200 | 225 | 175 |
| BC Ceramic Disc | 3700 | 225 | 200 | 175 |
| AP Conventional | 870 | 1425 | 1575 | 950 |
| AP Ceramic Disc | 1130 | 375 | 450 | 325 |
| AM Conventional | 1080 | 175 | 150 | 200 |
| AM Ceramic Disc | 1320 | 125 | 100 | 100 |

AF = Alphafine ®
BG = Betagloss ®
AC = Alphacote ® See Tables 1 and 2 for further description.
BC = Betacote ®
AP = Alphaplate ®
AM = Acme ®

EXAMPLE 12

In the present Example, a ceramic filter of the type described i connection with Example 1, was utilized for purposes of filtering a fine grey kaolin feed which was characterized as having a particle size distribution by weight of 98%<1 $\mu$m; 89%<$\frac{1}{2}$ $\mu$m; and 63%<$\frac{1}{4}$ $\mu$m. This feed was obtained from a classifier stage used in the plant process for producing the calciner feed normally used to produce the calcined clay product Alphatex ® of the assignee ECC America Inc. In order to compare the use of the present filter with conventional technology, a series of samples having the aforementioned feed slurried at between 40 and 42% were provided to a conventional rotary vacuum filter, and it was found that the production rate in a series of such samples ranged from about 3–4 dry lbs of clay/ft$^2$ of filter surface/hour. The feed to the filter in all instances was fully dispersed being at a pH at about 9.0. A slurry fully dispersed at a pH of about 7.3 of the same material, when provided to the said ceramic filter disc, was found to be filtered at a rate of 44.6 dry lbs/ft$^2$ of filter surface/hour, approximately 10 times higher than the filtering rate with the conventional technology.

EXAMPLE 13

A very unique aspect of the invention relates the ability to dewater kaolin clay slurries at various pH ranges and dispersion states. An Alphacote slurry product is used in a series of experiments that demonstrate the following:

TABLE 4

| Feed Clay - Alphacote Feed Solids - 25% Temperature - 40° C. | | |
|---|---|---|
| pH | % Solids | lbs/ft$^2$/hour |
| 2 | 56 | 19 |
| 3 | 60.7 | 12.8 |
| 4 | 68.4 | 4.3 |
| 5 | 69.5 | 3.5 |
| 6 | 70.8 | 3.6 |
| 7 | 71.2 | 3.5 |

TABLE 4-continued

Feed Clay - Alphacote
Feed Solids - 25%
Temperature - 40° C.

| pH | % Solids | lbs/ft$^2$/hour |
|---|---|---|
| 8 | 71.1 | 3.5 |
| 9 | 82.0 | 3.3 |

These results indicate the versatility of dewatering at various pH's and the high rates and solids achievable throughout the pH ranges 2 to 9.

While the present invention has been particularly set forth and comes with specific embodiments thereof, it will be understood in view of the present teaching that numerous variations upon the invention are now enabled to those skilled in the art which variations yet reside within the scope of the instant teaching. Accordingly, the invention is to be broadly construed and limited only by the scope and spirit of the claims now appended hereto.

What is claimed is:

1. In the process for beneficiating a crude kaolin by the method which includes a wet classification step to provide a classified kaolin fraction having a PSD such that at least 50% by weight thereof are of less than $\frac{1}{2}$ $\mu$m ESD and substantially 100% by weight are of less than 10 $\mu$m ESD; and one or more steps wherein an aqueous slurry of the classified kaolin is at least partially dewatered by filtration; the improvement which comprises:

effecting at least one of said one or more filtration steps, by flowing said aqueous kaolin slurry through a ceramic filter plate which is characterized by a porous support layer and an overlying porous filtration layer, the ratio between the respective mean pore sizes of the filtration layer material and the base layer material being between about 2 and 50; the pore size in said filtration layer being in the range of from about 1 to 3 $\mu$m, and the pore size in the base layer being in the range of from about 4 to 50 $\mu$m; and said flow through said filter plate being from said filter layer toward said base layer, and being effected by establishing a fluid pressure differential across the said filter plate.

2. A method in accordance with claim 1, wherein said kaolin subjected to said filtration is substantially fully dispersed in said slurry.

3. A method in accordance with claim 2, wherein the pH of the aqueous kaolin slurry is in the range of 6.0 to 8.0.

4. A method in accordance with claim 1, wherein said kaolin subjected to said filtration is at least partially dispersed.

5. A method in accordance with claim 1, wherein said kaolin subjected to said filtration is in a flocculated state.

6. A method in accordance with claim 2, wherein said crude kaolin is a grey kaolin; and wherein said classified fraction has a PSD such that >95% by weight thereof are less than 1 $\mu$m ESD.

7. A method in accordance with claim 6, wherein said fraction prior to said filtration step has been subjected to high intensity magnetic separation as a dispersed slurry, and is passed to said ceramic filter from said magnetic separation without intervening flocculation.

8. A method in accordance with claim 7, wherein the partially dewatered slurry from said ceramic filter is spray dried to provide a feed for subsequent calcination.

9. A method in accordance with claim 7, wherein said fraction has been subjected to oxidative bleaching upstream of said magnetic separation.

10. A method in accordance with claim 5, wherein the partially dewatered kaolin slurry from said filter is dispersed and dewatered at a further ceramic filter to provide a high solids slurry including greater than 70% by weight solids.

11. A method in accordance with claim 10, wherein the said high solids slurry is spray dried.

12. A method in accordance with claim 4, wherein the slurry provided to said ceramic filter includes about 60% solids, the slurry being further dewatered by said ceramic filter to provide a slurry with greater than 70% solids.

13. A method in accordance with claim 1, wherein the pH of the kaolin slurry being filtered is in the range of 2.0 to 10.0.

14. A method for filtering an aqueous slurry of at least partially dispersed fine particle size kaolin, comprising flowing said aqueous kaolin slurry through a ceramic filter plate which is characterized by a porous support layer and an overlying porous filtration layer, the ratio between the respective mean pore sizes of the filtration layer material and the base layer material being between about 2 and 50; the pore size in said filtration layer being in the range of from about 1 to 3 $\mu$m, and the pore size in the base layer being in the range of from about 4 to 50 $\mu$m; and said flow through said filter plate being from said filter layer toward said base layer, and being effected by establishing a fluid pressure differential across the said filter plate.

15. A method in accordance with claim 14, wherein said kaolin is fully dispersed.

16. A method in accordance with claim 15, wherein said kaolin has a PSD wherein at least 50% by weight of the particles <$\frac{1}{2}$ $\mu$m.

17. A method for filtering substantially the entirety of the suspended material from an aqueous kaolin slurry, while said kaolin is in a flocculated state; said kaolin being characterized by having over 45% by weight of its particles less than $\frac{1}{4}$ $\mu$m; said method comprising by flowing said aqueous kaolin slurry through a ceramic filter plate which is characterized by a porous support layer and an overlying porous filtration layer, the ratio between the respective mean pore sizes of the filtration layer material and the base layer material being between about 2 and 50; the pore size in said filtration layer being in the range of from about 1 to 3 $\mu$m, and the pore size in the base layer being in the range of from about 4 to 50 $\mu$m; and said flow through said filter plate being from said filter layer toward said base layer, and being effected by establishing a fluid pressure differential across the said filter plate.

* * * * *